(12) United States Patent
Bueb et al.

(10) Patent No.: US 12,456,507 B2
(45) Date of Patent: Oct. 28, 2025

(54) TECHNIQUES FOR DATA REFRESH BASED ON ENVIRONMENTAL CONDITIONS

(71) Applicant: Micron Technology, Inc., Boise, ID (US)

(72) Inventors: Christopher Joseph Bueb, Folsom, CA (US); Ting Luo, Santa Clara, CA (US); Luca Porzio, Casalnuovo (IT); Gianluca Coppola, Liveri (IT); Ryan Laity, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 18/403,468

(22) Filed: Jan. 3, 2024

(65) Prior Publication Data
US 2024/0242752 A1 Jul. 18, 2024

Related U.S. Application Data

(60) Provisional application No. 63/439,030, filed on Jan. 13, 2023.

(51) Int. Cl.
*G11C 11/406* (2006.01)

(52) U.S. Cl.
CPC .. *G11C 11/40626* (2013.01); *G11C 11/40615* (2013.01); *G11C 11/40622* (2013.01)

(58) Field of Classification Search
CPC ........ G11C 11/40626; G11C 11/40615; G11C 11/40622
USPC .......................................................... 365/222
See application file for complete search history.

(56) References Cited

U.S. PATENT DOCUMENTS

2019/0205244 A1* 7/2019 Smith ..................... G06F 3/065

* cited by examiner

*Primary Examiner* — Fernando Hidalgo
(74) *Attorney, Agent, or Firm* — Holland & Hart LLP

(57) ABSTRACT

Methods, systems, and devices for techniques for data refresh based on environmental conditions are described. A memory system may program data to a set of blocks, where an order in which the data be programmed to respective blocks of the set of blocks may be based on a first block ordering. The memory system may also program respective indications of respective temperatures of the programming for the respective blocks. The memory system may identify, during a start-up procedure, a flag indicating to perform a refresh operation for the set of blocks. As such, the memory system may perform during the start-up procedure, the refresh operation for the set of blocks using a second block ordering. In some examples, the second block ordering may be based on the respective indications of the respective temperatures for the set of blocks.

20 Claims, 6 Drawing Sheets

TECHNIQUES FOR DATA REFRESH BASED ON ENVIRONMENTAL CONDITIONS

CROSS REFERENCE

The present Application for Patent claims priority to and the benefit of U.S. Provisional Application No. 63/439,030 by Bueb et al., entitled "TECHNIQUES FOR DATA REFRESH BASED ON ENVIRONMENTAL CONDITIONS," filed Jan. 13, 2023, assigned to the assignee hereof, and which is expressly incorporated by reference in its entirety herein.

FIELD OF TECHNOLOGY

The following relates to one or more systems for memory, including techniques for data refresh based on environmental conditions.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
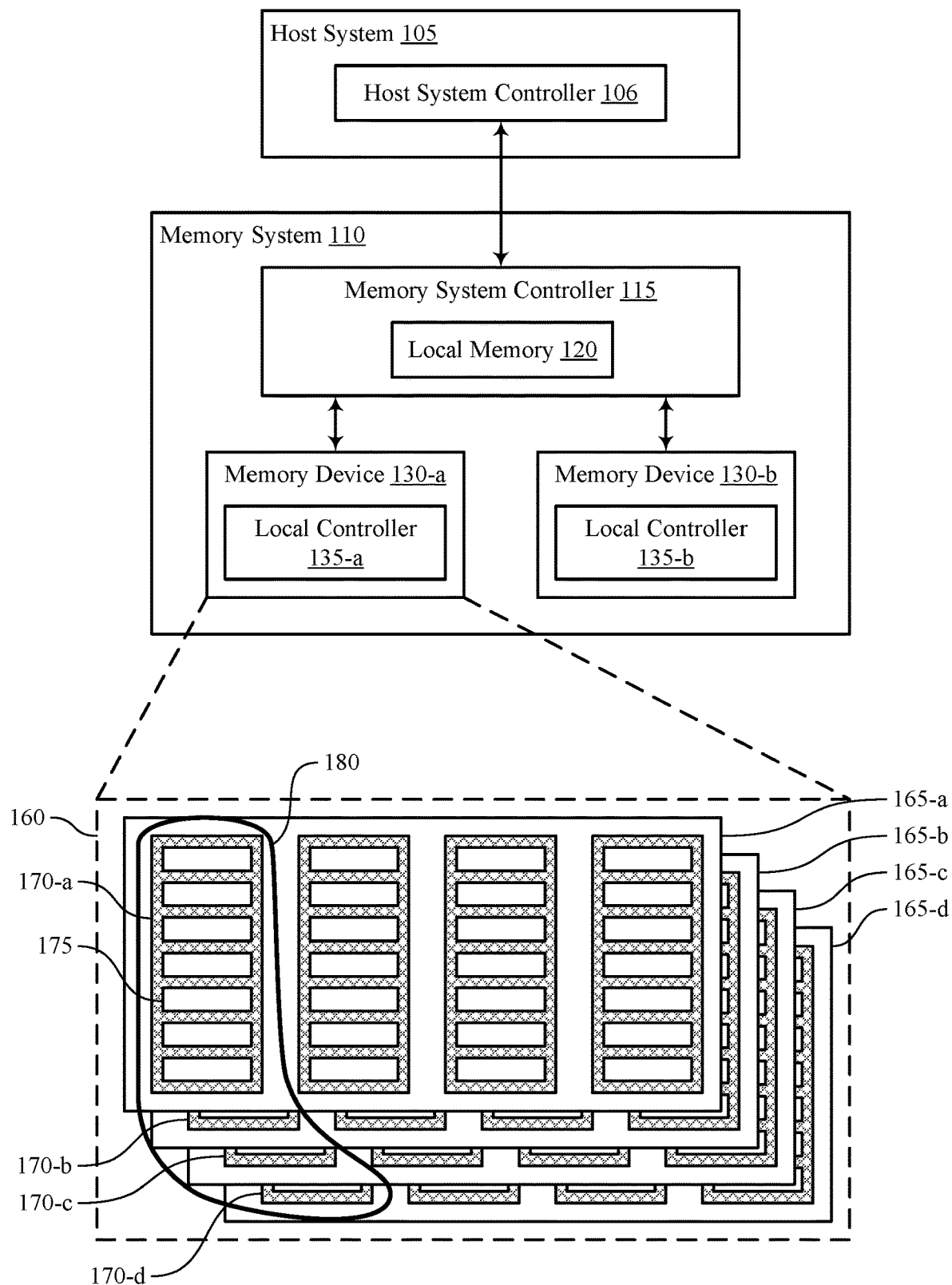
FIG. 1 illustrates an example of a system that supports techniques for data refresh based on environmental conditions in accordance with examples as disclosed herein.

Some memory systems (e.g., solid state drives (SSDs)) are used for non-volatile storage of data on a host system. Mobile computing devices may be dependent upon the use of these memory systems to store operating instructions, applications, and data used to configure the mobile devices in response to being activated. Manufacturers of these mobile systems may program these memory systems with some information before the memory systems are integrated with the mobile devices. As such, the data programmed into these memory systems potentially encounter data errors caused by the final manufacturing steps used to make the mobile devices. For example, some manufacturing steps may expose the memory systems to high heat (e.g., soldering processes), which may introduce errors into the data already stored in the memory system. Additionally, information stored in the memory systems may be stored to various regions of the memory system (e.g., a block, a super-block, or a super-block region) at different times during the programming process. Due to self-heating at the memory system, a first block may be programmed at a first temperature and a second block may be programmed at a second temperature. The variation in temperature during programming for a given block may give rise to varying levels of data errors for each respective block during the soldering process. In some examples, the memory system may undergo a data refresh operation in-factory to correct the data errors of the memory system. If the data refresh operation is not completed in-factory, the data refresh operation may be finished when operated by a customer (e.g., in-field). However, the varying levels of data errors for a given block may result in an unpredictable amount of time being taken during customer usage to complete the data refresh operation.

Implementations described herein address the aforementioned shortcomings and other shortcomings by providing a mechanism to prioritize data refresh for blocks with a greater quantity of errors while in-factory. For example, during programming, the blocks may be programmed using a first block ordering where a respective temperature of each block during programming may be stored. As such, during the data refresh operation, the blocks may be ordered via a second block ordering based on the temperature of each block during programming. In some examples, blocks with respective temperatures equal to or above (e.g., satisfies) a configured temperature threshold may be prioritized in the second ordering. Additionally, or alternatively, the second block ordering may be based on a temperature difference between the temperature of the memory system during the refresh operation and the respective temperatures for the set of blocks stored during programming. For instance, the second block ordering may prioritize blocks with a larger temperature difference over blocks with a smaller temperature difference. By prioritizing data refresh based on the temperature of the blocks recorded during initial programming, the computing device may be more likely to correct a greater quantity of data errors while in factory, which may decrease the duration of the data refresh operation during customer usage. As such, a device operating in accordance with the techniques described herein may benefit from an increase in data refresh efficiency and an increase in user reliability.

Figure 2:
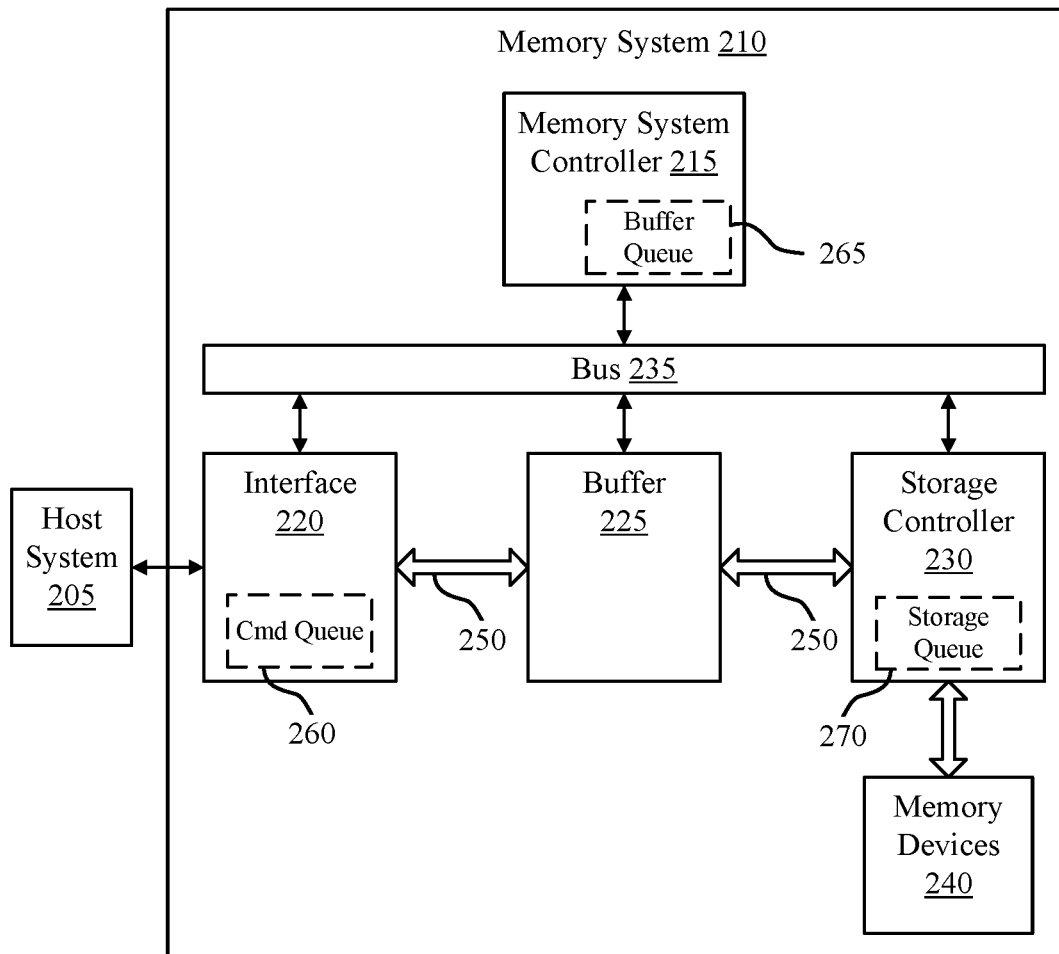
FIG. 2 illustrates an example of a system that supports techniques for data refresh based on environmental conditions in accordance with examples as disclosed herein.
Figure 3:
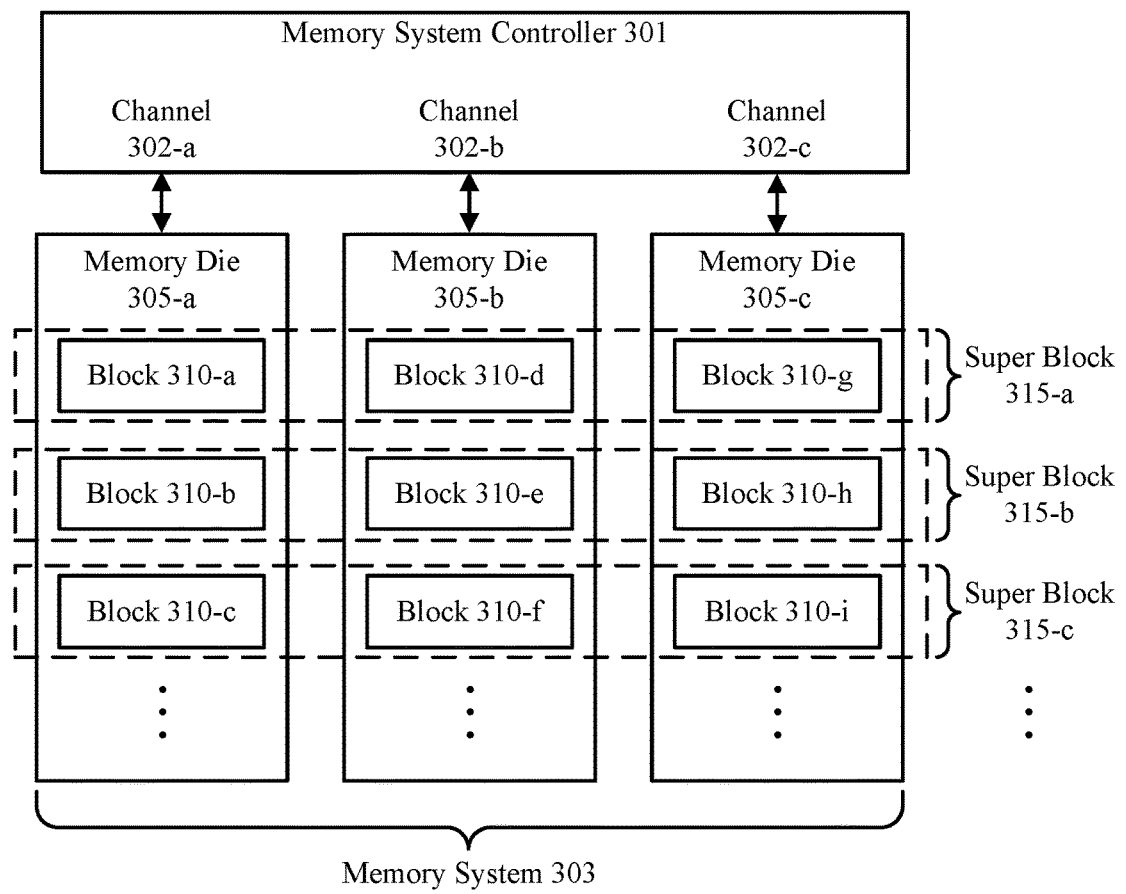
FIG. 3 illustrates an example of a system that supports techniques for data refresh based on environmental conditions in accordance with examples as disclosed herein.

Features of the disclosure are initially described in the context of systems with reference to FIGS. 1 through 3. Features of the disclosure are described in the context of process flows with reference to FIG. 4. These and other features of the disclosure are further illustrated by and described in the context of an apparatus diagram and flowchart that relate to techniques for data refresh based on environmental conditions with reference to FIGS. 5 and 6.

FIG. 1 illustrates an example of a system 100 that supports techniques for data refresh based on environmental conditions in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for data refresh based on environmental conditions. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Implementations described herein provide a mechanism to prioritize data refresh for blocks 170 with a greater quantity of errors while in-factory. For example, during programming, the blocks 170 may be programmed using a first block ordering where a respective temperature of each block during programming may be stored. As such, during the data refresh operation, the blocks 170 may be ordered via a second block ordering based on the temperature of each block during programming. In some examples, blocks 170 with respective temperatures equal to or above a configured temperature threshold may be prioritized in the second ordering. Additionally, or alternatively, the second block ordering may be based on a temperature difference between the temperature of the memory system 110 during the refresh operation and the respective temperatures for the set of blocks 170 stored during programming. For instance, the second block ordering may prioritize blocks 170 with a larger temperature difference over blocks 170 with a small temperature difference. By prioritizing data refresh based on the temperature of the blocks 170 recorded during initial programming, the computing device may be more likely to correct a greater quantity of data errors during in-factory programming, which may decrease the duration of the data refresh operation during customer usage. As such, a device operating in accordance with the techniques described herein may benefit from an increase in data refresh efficiency and an increase in user reliability.

FIG. 2 illustrates an example of a system 200 that supports techniques for data refresh based on environmental conditions in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Implementations described herein provide a mechanism to prioritize data refresh for blocks with a greater quantity of errors while in-factory. For example, during programming, the blocks may be programmed using a first block ordering where a respective temperature of each block during programming may be stored. As such, the data refresh operation may be performed using a second block ordering based on the temperature of each block during programming. In some examples, blocks with respective temperatures equal to or above a configured temperature threshold may be prioritized in the second ordering. Additionally, or alternatively, the second block ordering may be based on a temperature difference between the temperature of the memory system 210 during the refresh operation and the respective temperatures for the set of blocks stored during programming. For instance, the second block ordering may prioritize blocks with a larger temperature difference over blocks with a small temperature difference. By prioritizing data refresh based on the temperature of the blocks recorded during initial programming, the computing device may be more likely to correct a greater quantity of data errors during in-factory programming, which may decrease the duration of the data refresh operation during customer usage. As such, a device operating in accordance with the techniques described herein may benefit from an increase in data refresh efficiency and an increase in user reliability.

FIG. 3 illustrates an example of a system 300 that supports techniques for data refresh based on environmental conditions in accordance with examples as disclosed herein. In some examples, system 300 may be implemented by one or more aspects of systems 100 and/or 200. For instance, system 300 may include a memory system 303 which may be an example of a memory system 110 or a memory system 210 with reference to FIG. 1 and FIG. 2 respectively. As such, the memory system 303 may include a memory system controller 301 and a set of memory dies 305 (e.g., dies 160 with reference to FIG. 1), where each memory die 305 may include a set of blocks 310 (e.g., blocks 170 with reference to FIG. 1). Further, memory system controller 301 may be an example of a memory system controller 115 or a memory system controller 215 with reference to FIG. 1 and FIG. 2 respectively. In some examples, the system 300 may illustrate examples of data programming and data refresh operations that may occur during manufacturing and deployment of the memory system 303.

In some examples, the memory system 303 may be associated (e.g., coupled) with one or more channels 302 which may facilitate the transfer of data to one or more memory cells of the memory die 305. In the example of FIG. 3, the memory system controller 301 may include a channel 302-a associated with a first memory die 305-a, a channel 302-b associated with a second memory die 305-b, and a channel 302-c associated with a third memory die 305-c. In some examples, each of the memory dies 305 may include one or more blocks 310 where each block 310 may include a respective set of pages (e.g., pages 175), and each page may include a set of memory cells. As illustrated in FIG. 3, the memory die 305-a may include blocks 310-a, 310-b, and 310-c, the memory die 305-b may include blocks 310-d, 310-e, and 310-f, and the memory die 305-c may include blocks 310-g, 310-h, and 310-i. In some examples, a set of blocks 310 distributed across multiple memory dies 305 may form a super block 315. For example, super block 315-a may include blocks 310-a, 310-d, and 310-g, super block 315-b may include blocks 310-b, 310-e, and 310-h, and super block 315-c may include blocks 310-c, 310-f, and 310-i. While FIG. 3 illustrates the memory system 303 including three memory dies 305, it is understood that a memory system 303 may include any quantity of memory dies 305, where each memory die may include any quantity of blocks 310.

In some examples, the memory system may undergo a preprogramming operation. For example, the memory system controller 301 may receive a set of commands from a host system (e.g., a host system 105 or 205) to instruct the memory system controller 301 to receive and store data within the memory system 303. As such, the memory system controller 301 may transfer the data associated with the set of commands to the memory dies 305 using the respective channels 302. The data stored to the memory system 303 may be organized on the blocks level or on the super block level.

After the data is stored, the memory system 303 may be soldered to another assembly (e.g., printed circuit board) to form a computing system. For example, the memory system 303 may be soldered to a printed circuit board that may be used in a variety of applications. In some cases, a processor and other components may also be coupled with the printed circuit board. Errors may be introduced into the data by the high temperatures that occur during a soldering process. In some examples, a quantity of errors within the data may vary on the block or super-block level. For instance, during the duration of preprogramming the memory system 303, the memory dies 305 may experience variation in temperature due to self-heating, where the temperature while programming a portion of data may affect the quantity of errors that occur in that portion of data during the soldering operation. For example, data stored to block 310-a may be programmed at a first temperature and data stored to block 310-b may be programmed at a second temperature greater than the first temperature. As such, data stored to the block 310-b may experience a greater quantity of data errors during a soldering operation relative to data stored to the block 310-a.

At first start-up of the memory system after being soldered, the memory system controller 301 may refresh data stored in the memory system. As soon as possible (e.g., at first system start-up), the memory system 303 may attempt to refresh contents in the NAND cells to ensure that the data is stored in more reliable way. In some examples, the first start-up may occur while the memory system is in the manufacturing stage (e.g., in-factory). In some cases, however, there may be a limited amount of time allotted to perform a data refresh operation during the manufacturing stage of the computing system. As such, a portion of the data refresh may occur during the manufacturing stage, and the remaining portion of the data refresh may occur after delivery to a customer. However, the varying levels of data errors for a given block 310 may result in a varying level of time during customer usage to complete the data refresh operation.

As such, during the first start-up procedure, the memory system may prioritize refreshing data for blocks 310 with a greater quantity of data errors. For example, during programming, the blocks 310 may be programmed using a first block ordering 320. As illustrated in FIG. 3, the first block ordering 320 may correspond to a super block 315 ordering. For example, data may be stored to the memory dies 305 concurrently on a per super block 315 basis. In such examples, the first block ordering may follow the order of block 310-a, 310-d, 310-g, 310-b, 310-e, 310-h, 310-c, 310-f, 310-i. Additionally, or alternatively, the data may be stored on a per memory die 305 basis (e.g., data is first stored to memory die 305-a, followed by memory die 305-b, and then followed by memory die 305-c). In such examples, the first block ordering 320 may follow the order of block 310-a, 310-b, 310-c, 310-d, 310-e, 310-f, 310-g, 310-h, 310-i.

In some cases, a respective temperature for each block 310 may be stored to the memory system during programming of a given block 310. For example, the memory system 303 may store a temperature for a given block 310 during programming of the given block 310, where the memory system 303 stores an indication of temperature for each block 310 during programming.

Based on finishing the initial programming process, the memory system 303 may indicate to perform a data refresh operation during the initial start-up of the memory system 303. For example, the memory system may set a flag to a first value, where the first value indicates to perform the data refresh operation. As such, during the initial start-up of the memory system 303 after the soldering operation, the memory system 303 may identify that the flag is of the first value and begin the refresh operation on the blocks 310. In some examples, the order in which a block undergoes data refresh may be based on a second block ordering 325, where the second block ordering 325 is based on the recorded temperature of each block 310 during programming.

In some examples, the second block ordering 325 may be based on a temperature difference of each block 310 relative to the temperature of the memory system during the initial start-up. For example, during the initial start-up, the memory system may identify a temperature of the memory system and generate the second block ordering 325 based on respective temperature differences between the temperature of the memory system and the respective indications of the respective temperatures for the blocks 310 stored during programming. In such examples, a first block 310 with a first temperature difference may be prioritized for data refresh over a second block 310 with a second temperature difference based on the first temperature difference being greater than the second temperature difference. As illustrated in FIG. 3, block 310-i may be first in the second block ordering 325 based on having the greatest temperature difference.

Additionally, or alternatively, the second block ordering 325 may be ordered such that blocks 310 with a stored temperature above a configure threshold may be prioritized. For example, with reference to FIG. 3, blocks 310-i, 310-f, and 310-h may have recorded temperatures above the configured threshold. As such, the second block ordering may prioritize blocks 310-i, 310-f, and 310-h over the other blocks 310.

Additionally, or alternatively, the second block ordering 325 may order the blocks 310 based on the absolute temperature of each block 310 during programming. For example, with reference to FIG. 3, the second block ordering 325 may order the blocks in accordance with their absolute temperature recorded during programming, where block 310-i may have the highest recorded absolute temperature and block 310-a may have the lowest recorded absolute temperature.

In some examples, the memory system may complete a portion of the refresh operation during the initial start-up procedure. As such, during a second start-up procedure following the initial start-up procedure, the memory system may identify that the flag indicating to perform the data refresh operation is still of the first value. The memory system may identify that a first subset of blocks 310 have undergone the data refresh operation in accordance with the second block ordering 325. As such, the memory system may continue, during the second start-up procedure, a second portion of the refresh operation for the remaining blocks 310. In some examples, the second portion of the refresh operation may continue to follow the second block ordering. For instance, with reference to FIG. 3, if blocks 310-i, 310-f, 310-h, and 310-c underwent data refresh during the initial start-up procedure, then blocks 310-e, 310-g, 310-b, 310-d, and 310-a may undergo data refresh during the second start-up procedure, in that order.

Additionally, or alternatively, during the second start-up procedure, the memory system may generate a third block ordering associated with the remaining blocks 310. In some examples, the memory system may identify, during the second start-up procedure, a temperature of the memory system, and generate the third block ordering based on respective temperature differences between the temperature of the memory system and the respective indications of the respective temperatures for the remaining set of blocks. In some examples, the memory system may generate the third block ordering based on the absolute temperatures of the remaining blocks 310 recorded during programming.

Based on completing the data refresh operation, the memory system may switch the flag associated with performing the data refresh operation to a second value. In some examples, the second value of the flag may indicate that the data refresh operation is complete. During, a start-up operation, the memory system controller 301 may receive one or more commands associated with one or more host operations that occur during start-up. As such, while the flag is of the first value, the memory system controller 301 may prioritize performing the data refresh operation over performing the one or more host operations.

Figure 4:
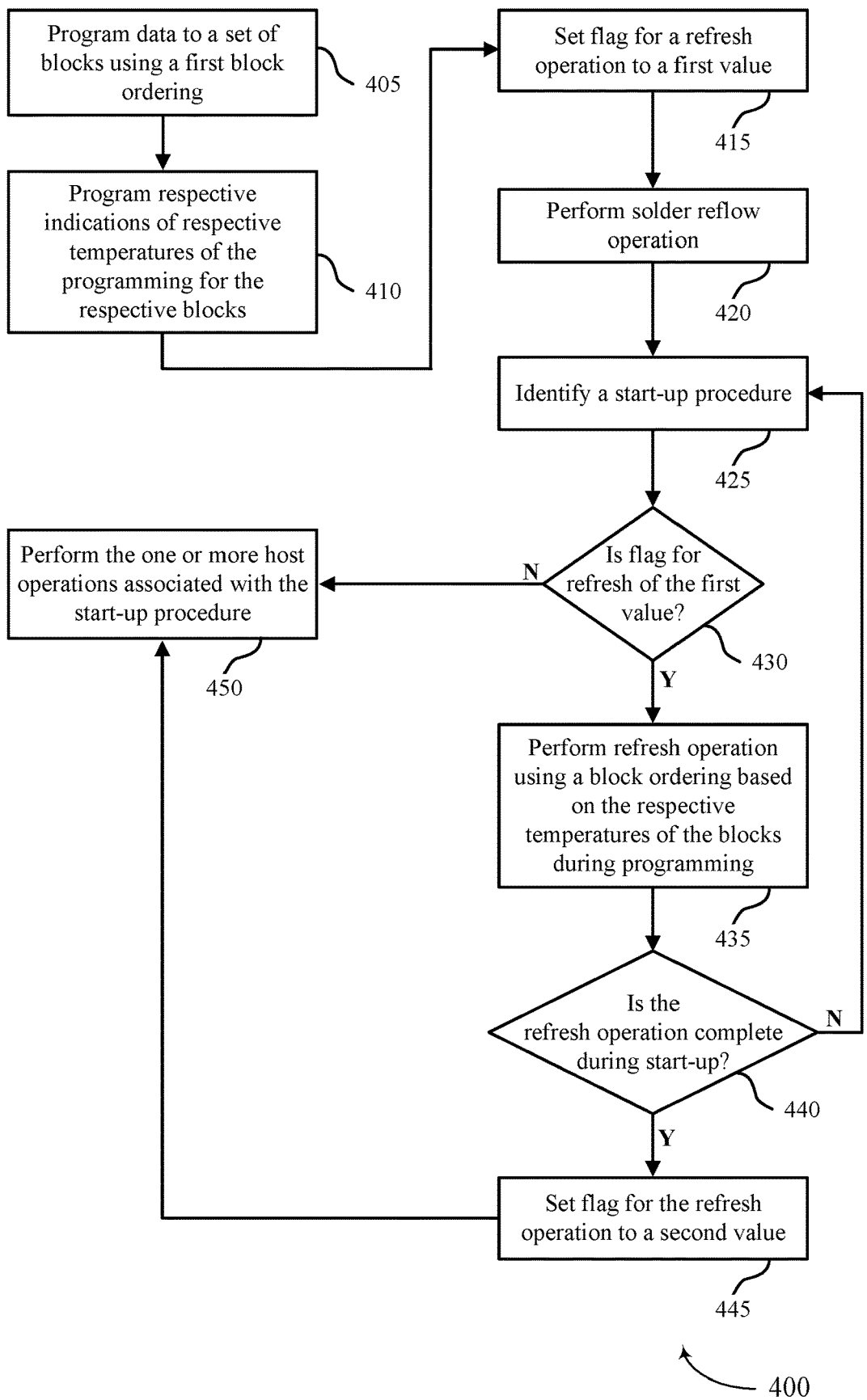
FIG. 4 illustrates an example of a process flow that supports techniques for data refresh based on environmental conditions in accordance with examples as disclosed herein.

FIG. 4 illustrates an example of a process flow 400 that supports techniques for data refresh based on environmental conditions in accordance with examples as disclosed herein. In some examples, process flow 400 may be implemented by one or more aspects of systems 100 through 300. For instance, process flow 400 may be implemented by a memory system 110, 210, or 303 as described with reference to FIGS. 1-3. In some examples, process flow 400 may correspond to one or more data preprogramming operations during a manufacturing process of a device, one or more solder reflow operations of the device, and one or more data refresh operations of the device. Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, in response to being executed by a controller (e.g., the memory system controller 115), may cause the controller to perform the operations of the process flow 400.

At 405, the memory system controller may program, at the memory system, data to a set of blocks of the memory system, where an order in which the data is programmed to respective blocks of the set of blocks may be based on a first block ordering (e.g., first block ordering 320).

At 410, the memory system controller may program, at the memory system, respective indications of respective temperatures during programming for the respective blocks. For example, during programming of a given block, the memory system controller may identify and store the temperature of the given block to the memory system.

In some cases, during an initial programming operation (e.g., preprogramming) at 405 or 410, the memory system may identify blocks for refreshing as part of the initial programming operation. For example, if programming of blocks occurs at a temperature below a first threshold temperature at a beginning of a programming operation, the memory system may refresh the blocks once the temperature reaches a second threshold temperature. The refresh may occur, for example, interspersed with additional programming operations at 405 and 410. This may, for example, improve data reliability when a subsequent solder reflow operation occurs.

At 415, the memory system may set a flag indicating to perform a refresh operation on the set of blocks to a first value. In some examples, the first value of the flag may indicate for the memory system to perform a data refresh operation of the set of blocks during one or more start-up procedures. In some examples, setting the flag to the first value may be based on programming the data to the set of blocks.

At 420, the memory system may undergo a solder reflow operation. After the data is stored to the set of blocks, the memory system may be soldered to another assembly to form a computing system. For example, the memory system may be soldered to a printed circuit board that may be used in a variety of applications. In some cases, a processor and other components may also be coupled with the printed circuit board. Errors may be introduced into the data by the high temperatures that occur during a soldering process. In some examples, a quantity of errors within the data may vary on the block or super block level. For instance, during the duration of preprogramming the memory system may experience variation in temperature due to self-heating, where the temperature while programming a portion of data may affect the quantity of errors that occur in that portion of data during the soldering reflow operation.

At 425, the memory system may identify a start-up procedure. For example, the memory system may identify a power-on or reset of the memory system. At 430, the memory system may identify, during the start-up procedure, whether the flag indicating to perform the refresh operation for the set of blocks is set to the first value.

If at 430 the memory system identifies that the flag is set to a value different from the first value (e.g., a second value), then at 450, the memory system may perform one or more host operations associated with the start-up procedure.

If at 430 the memory system identifies that the flag is set to the first value, the memory system controller may perform, during the start-up procedure, the refresh operation for the set of blocks using a second block ordering (e.g., second block ordering 325). In some examples, the memory system controller may identify, during the start-up procedure, one or more commands associated with one or more host operations, and may perform the refresh operation before performing the one or more host operations based on identifying the flag is of the first value.

In some examples, the second block ordering may be based on the respective indications of the respective temperatures for the set of blocks stored during programming. For example, the memory system controller may identify, during the start-up procedure, a temperature of the memory system, and generate the second block ordering based on respective temperature differences between the temperature of the memory system and the respective indications of the respective temperatures for the set of blocks. For instance, the memory system controller may order in the second block ordering, a first block with a first temperature difference before a second block with a second temperature difference based on the first temperature difference being greater than the second temperature difference.

Additionally, or alternatively, the memory system controller may, in the second block ordering, prioritize blocks with a stored temperature above a configured threshold. For example, the memory system controller may order in the second block ordering, a first block with a first temperature during the programming before a second block with a second temperature during the programming based on the first temperature satisfying (e.g., being equal to or above) a temperature threshold. In some examples, the memory system may prioritize blocks programmed at colder temperatures for the refresh operation. Prioritizing these blocks may allow the blocks to undergo the refresh operation prior to self-heating of the memory system, which may result in a decreased temperature differential between initial programming of these blocks and the temperature during the refresh operation.

In some examples, the start-up procedure may occur during the manufacturing stage of the memory system. In some examples, the duration of the start-up procedure during the manufacturing stage may be less than a duration of time to perform the refresh operation on the set of blocks. As such, the refresh operation may continue across one or more start-up operations.

At 440, the memory system may identify whether the refresh operation is complete during the initial start-up procedure.

If at 440, the memory system identifies that the refresh operation is complete, then at 445, the memory system may set the flag to a second value different from the first value based on completing the refresh operation. After setting the flag to the second value, at 450 the memory system may perform the one or more host operations associated with the start-up procedure.

If at 440, the memory system identifies that the refresh operation is not complete, the memory system may loop back to step 425, and identify a second start-up procedure. In some examples, the second start-up procedure may occur after the manufacturing process is complete (e.g., during user-operation). At 430, the memory system may identify that the flag is still set to the first value. As such, the memory system may identify that a first portion of the refresh operation is complete based on performing the refresh operation during the initial start-up procedure, where the first portion of the refresh operation is associated with a first subset of the set of blocks based on the second block ordering.

At 435, the memory system may perform, during the second start-up procedure, a second portion of the refresh operation for a second subset of the set of blocks using a third block ordering based on identifying that the first portion of the refresh operation is complete. In some examples, the third block ordering may be associated with continuing the second block ordering for the second subset of the set of blocks.

Additionally, or alternatively, the memory system controller may identify, during the second start-up procedure, a temperature of the memory system and generate the third block ordering based on respective temperature differences between the temperature of the memory system and the respective indications of the respective temperatures for the second subset of the set of blocks.

Additionally, or alternatively, the memory system controller may generate the third block ordering based on the respective indications of the respective temperatures of the programming for the respective second subset of blocks.

The memory system may continue the refresh operation over one or more start-up procedures until the refresh operation is complete.

Figure 5:
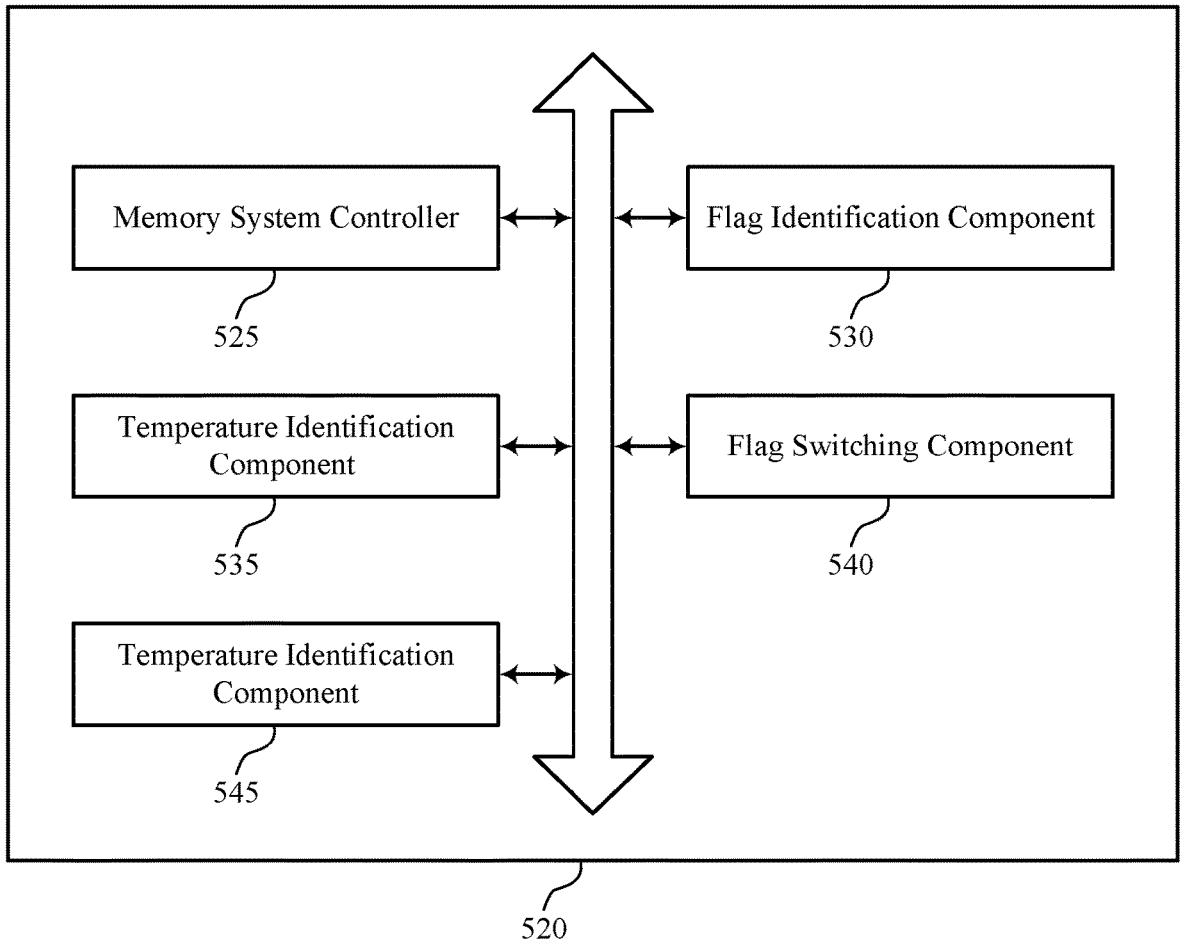
FIG. 5 shows a block diagram of a memory system that supports techniques for data refresh based on environmental conditions in accordance with examples as disclosed herein.

FIG. 5 shows a block diagram 500 of a memory system 520 that supports techniques for data refresh based on environmental conditions in accordance with examples as disclosed herein. The memory system 520 may be an example of aspects of a memory system as described with reference to FIGS. 1 through 4. The memory system 520, or various components thereof, may be an example of means for performing various aspects of techniques for data refresh based on environmental conditions as described herein. For example, the memory system 520 may include a memory system controller 525, a flag identification component 530, a temperature identification component 535, a flag switching component 540, a temperature identification component 545, or any combination thereof. Each of these components may communicate, directly or indirectly, with one another (e.g., via one or more buses).

The memory system controller 525 may be configured as or otherwise support a means for programming, at a memory system, data to a set of blocks of the memory system, where an order in which the data is programmed to respective blocks of the set of blocks is based at least in part on a first block ordering, and where programming the data to the set of blocks includes programming respective indications of respective temperatures of the programming for the respective blocks. In some cases, during an initial programming operation (e.g., preprogramming), the memory system controller 525 may identify blocks of the set of blocks for refreshing as part of the initial programming operation. For example, if programming of a subset of the set of blocks occurs at a temperature below a first threshold temperature at a beginning of a programming operation, the memory system may refresh the subset of the set of blocks once the temperature reaches a second threshold temperature (e.g., interspersed with programming other blocks of the set of blocks that are programmed as a part of the programming operation).

The flag identification component 530 may be configured as or otherwise support a means for identifying, during a start-up procedure, a flag indicating to perform a refresh operation for the set of blocks. In some examples, the memory system controller 525 may be configured as or otherwise support a means for performing, during the start-up procedure based at least in part on the flag, the refresh operation for the set of blocks using a second block ordering that is based at least in part on the respective indications of the respective temperatures for the set of blocks.

In some examples, the temperature identification component 535 may be configured as or otherwise support a means for identifying, during the start-up procedure, a temperature of the memory system. In some examples, the memory system controller 525 may be configured as or otherwise support a means for generating the second block ordering based at least in part on respective temperature differences between the temperature of the memory system and the respective indications of the respective temperatures for the set of blocks.

In some examples, to support generating the second block ordering, the memory system controller 525 may be configured as or otherwise support a means for ordering, in the second block ordering, a first block with a first temperature difference before a second block with a second temperature difference, where the first temperature difference is greater than the second temperature difference.

In some examples, the memory system controller 525 may be configured as or otherwise support a means for ordering, in the second block ordering, a first block with a first temperature during the programming before a second block with a second temperature during the programming, where the first temperature satisfies a temperature threshold.

In some examples, identifying the flag indicating to perform the refresh operation is based at least in part on programming the data to the set of blocks.

In some examples, a first value of the flag indicates to perform the refresh operation, and the flag switching component 540 may be configured as or otherwise support a means for switching the flag to a second value different from the first value based at least in part on completing the refresh operation.

In some examples, the memory system controller 525 may be configured as or otherwise support a means for identifying, during the start-up procedure, one or more commands associated with one or more host operations. In some examples, the memory system controller 525 may be configured as or otherwise support a means for performing the refresh operation before performing the one or more host operations based at least in part on identifying the flag indicating to perform the refresh operation.

In some examples, the flag identification component 530 may be configured as or otherwise support a means for identifying, during a second start-up procedure, the flag indicating to perform the refresh operation for the set of blocks. In some examples, the memory system controller 525 may be configured as or otherwise support a means for identifying that a first portion of the refresh operation is complete based at least in part on performing the refresh operation during the start-up procedure, where the first portion of the refresh operation is associated with a first subset of the set of blocks based at least in part on the second block ordering. In some examples, the memory system controller 525 may be configured as or otherwise support a means for performing, during the second start-up procedure, a second portion of the refresh operation for a second subset of the set of blocks using a third block ordering based at least in part on identifying that the first portion of the refresh operation is complete.

In some examples, the temperature identification component 545 may be configured as or otherwise support a means for identifying, during the second start-up procedure, a temperature of the memory system. In some examples, the memory system controller 525 may be configured as or otherwise support a means for generating the third block ordering based at least in part on respective temperature differences between the temperature of the memory system and the respective indications of the respective temperatures for the second subset of the set of blocks.

In some examples, the memory system controller 525 may be configured as or otherwise support a means for generating the third block ordering based at least in part on the respective indications of the respective temperatures of the programming for the respective second subset of blocks.

Figure 6:
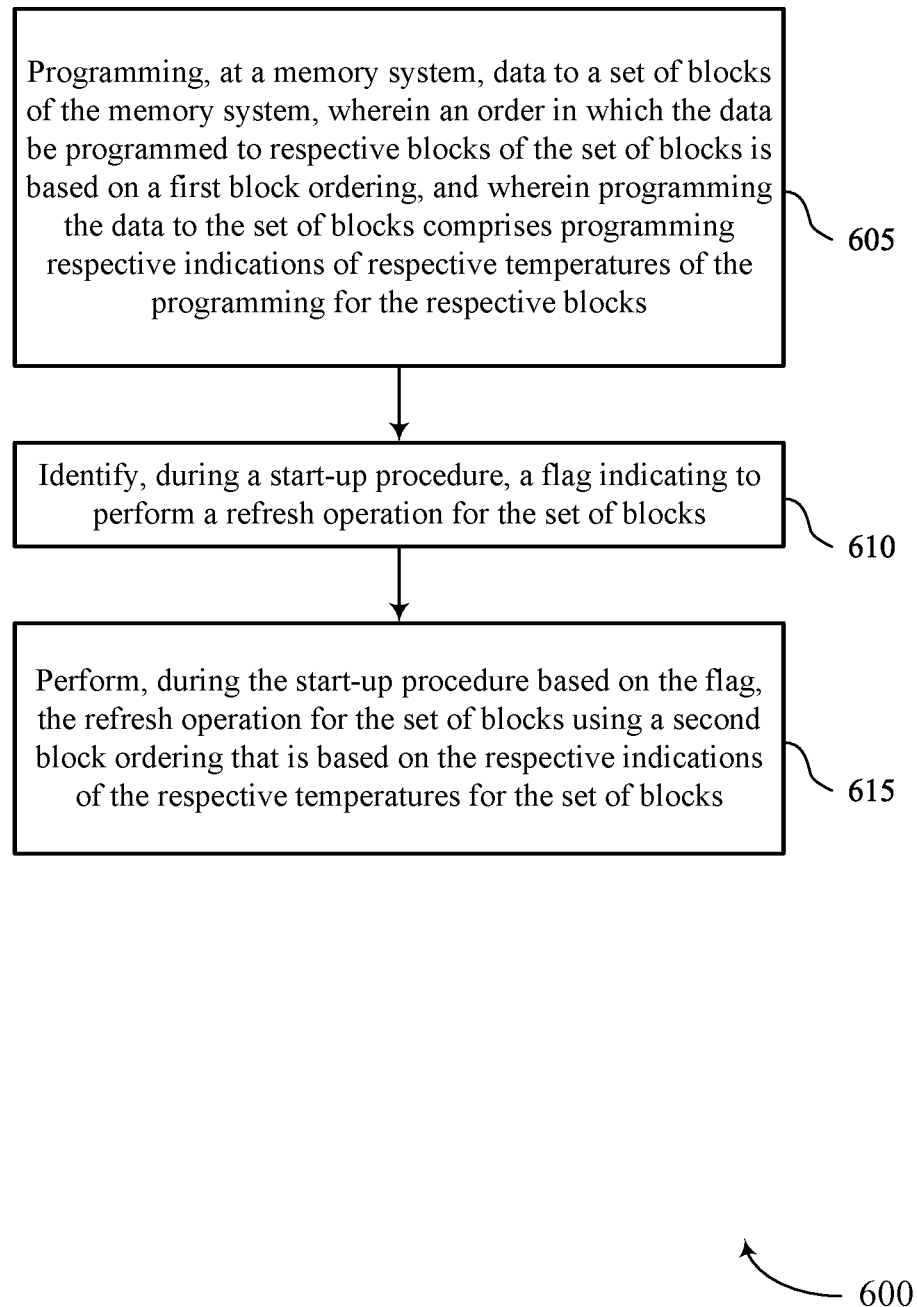
FIG. 6 shows a flowchart illustrating a method or methods that support techniques for data refresh based on environmental conditions in accordance with examples as disclosed herein.

FIG. 6 shows a flowchart illustrating a method 600 that supports techniques for data refresh based on environmental conditions in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include programming, at a memory system, data to a set of blocks of the memory system, where an order in which the data is programmed to respective blocks of the set of blocks is based at least in part on a first block ordering, and where programming the data to the set of blocks includes programming respective indications of respective temperatures of the programming for the respective blocks. The operations of 605 may be performed in accordance with examples as disclosed herein. In some examples, aspects of the operations of 605 may be performed by a memory system controller 525 as described with reference to FIG. 5.

At 610, the method may include identifying, during a start-up procedure, a flag indicating to perform a refresh operation for the set of blocks. The operations of 610 may be performed in accordance with examples as disclosed herein. In some examples, aspects of the operations of 610 may be performed by a flag identification component 530 as described with reference to FIG. 5.

At 615, the method may include performing, during the start-up procedure based at least in part on the flag, the refresh operation for the set of blocks using a second block ordering that is based at least in part on the respective indications of the respective temperatures for the set of blocks. The operations of 615 may be performed in accordance with examples as disclosed herein. In some examples, aspects of the operations of 615 may be performed by a memory system controller 525 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for programming, at a memory system, data to a set of blocks of the memory system, where an order in which the data is programmed to respective blocks of the set of blocks is based at least in part on a first block ordering, and where programming the data to the set of blocks includes programming respective indications of respective temperatures of the programming for the respective blocks; identifying, during a start-up procedure, a flag indicating to perform a refresh operation for the set of blocks; and performing, during the start-up procedure based at least in part on the flag, the refresh operation for the set of blocks using a second block ordering that is based at least in part on the respective indications of the respective temperatures for the set of blocks.

Aspect 2: The method, apparatus, or non-transitory computer-readable medium of aspect 1, further including operations, features, circuitry, logic, means, or instructions, or any combination thereof for identifying, during the start-up procedure, a temperature of the memory system and generating the second block ordering based at least in part on respective temperature differences between the temperature of the memory system and the respective indications of the respective temperatures for the set of blocks.

Aspect 3: The method, apparatus, or non-transitory computer-readable medium of aspect 2, where generating the second block ordering further includes operations, features, circuitry, logic, means, or instructions, or any combination thereof for ordering, in the second block ordering, a first block with a first temperature difference before a second block with a second temperature difference, where the first temperature difference is greater than the second temperature difference.

Aspect 4: The method, apparatus, or non-transitory computer-readable medium of any of aspects 1 through 3, further including operations, features, circuitry, logic, means, or instructions, or any combination thereof for ordering, in the second block ordering, a first block with a first temperature during the programming before a second block with a second temperature during the programming, where the first temperature satisfies a temperature threshold.

Aspect 5: The method, apparatus, or non-transitory computer-readable medium of any of aspects 1 through 4, where identifying the flag indicating to perform the refresh operation is based at least in part on programming the data to the set of blocks.

Aspect 6: The method, apparatus, or non-transitory computer-readable medium of any of aspects 1 through 5, where a first value of the flag indicates to perform the refresh operation and the method, apparatuses, and non-transitory computer-readable medium further includes operations, features, circuitry, logic, means, or instructions, or any combination thereof for switching the flag to a second value different from the first value based at least in part on completing the refresh operation.

Aspect 7: The method, apparatus, or non-transitory computer-readable medium of any of aspects 1 through 6, further including operations, features, circuitry, logic, means, or instructions, or any combination thereof for identifying, during the start-up procedure, one or more commands associated with one or more host operations and performing the refresh operation before performing the one or more host operations based at least in part on identifying the flag indicating to perform the refresh operation.

Aspect 8: The method, apparatus, or non-transitory computer-readable medium of any of aspects 1 through 7, further including operations, features, circuitry, logic, means, or instructions, or any combination thereof for identifying, during a second start-up procedure, the flag indicating to perform the refresh operation for the set of blocks; identifying that a first portion of the refresh operation is complete based at least in part on performing the refresh operation during the start-up procedure, where the first portion of the refresh operation is associated with a first subset of the set of blocks based at least in part on the second block ordering; and performing, during the second start-up procedure, a second portion of the refresh operation for a second subset of the set of blocks using a third block ordering based at least in part on identifying that the first portion of the refresh operation is complete.

Aspect 9: The method, apparatus, or non-transitory computer-readable medium of aspect 8, further including operations, features, circuitry, logic, means, or instructions, or any combination thereof for identifying, during the second start-up procedure, a temperature of the memory system and generating the third block ordering based at least in part on respective temperature differences between the temperature of the memory system and the respective indications of the respective temperatures for the second subset of the set of blocks.

Aspect 10: The method, apparatus, or non-transitory computer-readable medium of any of aspects 8 through 9, further including operations, features, circuitry, logic, means, or instructions, or any combination thereof for generating the third block ordering based at least in part on the respective indications of the respective temperatures of the programming for the respective second subset of blocks.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising: a controller associated with a memory device, wherein the controller is configured to cause the apparatus to:
   programming, at a memory system, data to a set of blocks of the memory system, wherein an order in which the data be programmed to respective blocks of the set of blocks is based at least in part on a first block ordering, and wherein programming the data to the set of blocks comprises programming respective indications of respective temperatures of the programming for the respective blocks;
   identify, during a start-up procedure, a flag indicating to perform a refresh operation for the set of blocks; and
   perform, during the start-up procedure based at least in part on the flag, the refresh operation for the set of blocks using a second block ordering that is based at least in part on the respective indications of the respective temperatures for the set of blocks.

2. The apparatus of claim 1, wherein the controller is further configured to cause the apparatus to:
   identify, during the start-up procedure, a temperature of the memory system; and
   generate the second block ordering based at least in part on respective temperature differences between the temperature of the memory system and the respective indications of the respective temperatures for the set of blocks.

3. The apparatus of claim 2, wherein generating the second block ordering is further configured to cause the apparatus to:
   order, in the second block ordering, a first block with a first temperature difference before a second block with a second temperature difference, wherein the first temperature difference is greater than the second temperature difference.

4. The apparatus of claim 1, wherein the controller is further configured to cause the apparatus to:
   order, in the second block ordering, a first block with a first temperature during the programming before a second block with a second temperature during the programming, wherein the first temperature satisfies a temperature threshold.

5. The apparatus of claim 1, wherein identifying the flag indicating to perform the refresh operation is based at least in part on programming the data to the set of blocks.

6. The apparatus of claim 1, wherein a first value of the flag indicates to perform the refresh operation, and the controller is further configured to cause the apparatus to:
   switch the flag to a second value different from the first value based at least in part on completing the refresh operation.

7. The apparatus of claim 1, wherein the controller is further configured to cause the apparatus to:
   identify, during the start-up procedure, one or more commands associated with one or more host operations; and
   perform the refresh operation before performing the one or more host operations based at least in part on identifying the flag indicating to perform the refresh operation.

8. The apparatus of claim 1, wherein the controller is further configured to cause the apparatus to:
   identify, during a second start-up procedure, the flag indicating to perform the refresh operation for the set of blocks;
   identify that a first portion of the refresh operation is complete based at least in part on performing the refresh operation during the start-up procedure, wherein the first portion of the refresh operation is associated with a first subset of the set of blocks based at least in part on the second block ordering; and
   perform, during the second start-up procedure, a second portion of the refresh operation for a second subset of the set of blocks using a third block ordering based at least in part on identifying that the first portion of the refresh operation is complete.

9. The apparatus of claim 8, wherein the controller is further configured to cause the apparatus to:
   identify, during the second start-up procedure, a temperature of the memory system; and
   generate the third block ordering based at least in part on respective temperature differences between the temperature of the memory system and the respective indications of the respective temperatures for the second subset of the set of blocks.

10. The apparatus of claim 8, wherein the controller is further configured to cause the apparatus to:
generate the third block ordering based at least in part on the respective indications of the respective temperatures of the programming for the respective second subset of blocks.

11. A non-transitory computer-readable medium storing code, the code comprising instructions executable by a processor to:
programming, at a memory system, data to a set of blocks of the memory system, wherein an order in which the data be programmed to respective blocks of the set of blocks is based at least in part on a first block ordering, and wherein programming the data to the set of blocks comprises programming respective indications of respective temperatures of the programming for the respective blocks;
identify, during a start-up procedure, a flag indicating to perform a refresh operation for the set of blocks; and
perform, during the start-up procedure based at least in part on the flag, the refresh operation for the set of blocks using a second block ordering that is based at least in part on the respective indications of the respective temperatures for the set of blocks.

12. The non-transitory computer-readable medium of claim 11, wherein the instructions are further executable by the processor to:
identify, during the start-up procedure, a temperature of the memory system; and
generate the second block ordering based at least in part on respective temperature differences between the temperature of the memory system and the respective indications of the respective temperatures for the set of blocks.

13. The non-transitory computer-readable medium of claim 12, wherein the instructions to generate the second block ordering are further executable by the processor to:
order, in the second block ordering, a first block with a first temperature difference before a second block with a second temperature difference, wherein the first temperature difference is greater than the second temperature difference.

14. The non-transitory computer-readable medium of claim 11, wherein the instructions are further executable by the processor to:
order, in the second block ordering, a first block with a first temperature during the programming before a second block with a second temperature during the programming, wherein the first temperature satisfies a temperature threshold.

15. The non-transitory computer-readable medium of claim 11, wherein identifying the flag indicating to perform the refresh operation is based at least in part on programming the data to the set of blocks.

16. The non-transitory computer-readable medium of claim 11, wherein a first value of the flag indicates to perform the refresh operation, and the instructions are further executable by the processor to:
switch the flag to a second value different from the first value based at least in part on completing the refresh operation.

17. The non-transitory computer-readable medium of claim 11, wherein the instructions are further executable by the processor to:
identify, during the start-up procedure, one or more commands associated with one or more host operations; and
perform the refresh operation before performing the one or more host operations based at least in part on identifying the flag indicating to perform the refresh operation.

18. The non-transitory computer-readable medium of claim 11, wherein the instructions are further executable by the processor to:
identify, during a second start-up procedure, the flag indicating to perform the refresh operation for the set of blocks;
identify that a first portion of the refresh operation is complete based at least in part on performing the refresh operation during the start-up procedure, wherein the first portion of the refresh operation is associated with a first subset of the set of blocks based at least in part on the second block ordering; and
perform, during the second start-up procedure, a second portion of the refresh operation for a second subset of the set of blocks using a third block ordering based at least in part on identifying that the first portion of the refresh operation is complete.

19. The non-transitory computer-readable medium of claim 18, wherein the instructions are further executable by the processor to:
identify, during the second start-up procedure, a temperature of the memory system; and
generate the third block ordering based at least in part on respective temperature differences between the temperature of the memory system and the respective indications of the respective temperatures for the second subset of the set of blocks.

20. A method, comprising:
programming, at a memory system, data to a set of blocks of the memory system, wherein an order in which the data is programmed to respective blocks of the set of blocks is based at least in part on a first block ordering, and wherein programming the data to the set of blocks comprises programming respective indications of respective temperatures of the programming for the respective blocks;
identifying, during a start-up procedure, a flag indicating to perform a refresh operation for the set of blocks; and
performing, during the start-up procedure based at least in part on the flag, the refresh operation for the set of blocks using a second block ordering that is based at least in part on the respective indications of the respective temperatures for the set of blocks.

* * * * *